US008564825B2

(12) United States Patent  (10) Patent No.: US 8,564,825 B2
Imamura  (45) Date of Patent: Oct. 22, 2013

(54) IMAGE PROCESSING DEVICE, IMAGE PROCESSING METHOD AND COMPUTER-READABLE MEDIUM

(75) Inventor: Takeru Imamura, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/406,120

(22) Filed: Feb. 27, 2012

(65) Prior Publication Data

US 2012/0224213 A1  Sep. 6, 2012

(30) Foreign Application Priority Data

Mar. 1, 2011  (JP) ................................ 2011-044056

(51) Int. Cl.
*G06K 15/02*  (2006.01)
(52) U.S. Cl.
USPC ......... 358/1.18; 358/3.28; 235/494; 382/232; 347/107
(58) Field of Classification Search
USPC ........ 358/1.14, 1.18, 3.28; 235/375; 347/107; 382/232
See application file for complete search history.

(56) References Cited

U.S. PATENT DOCUMENTS

| 8,371,511 | B2 * | 2/2013 | Tokumaru | 235/494 |
| 8,384,966 | B2 * | 2/2013 | Tsujita | 358/448 |
| 2007/0045427 | A1 * | 3/2007 | Onishi | 235/494 |
| 2007/0250714 | A1 * | 10/2007 | Kawada | 713/175 |
| 2008/0080777 | A1 * | 4/2008 | Tomita | 382/232 |
| 2008/0298631 | A1 * | 12/2008 | Nishida | 382/100 |
| 2009/0268259 | A1 * | 10/2009 | Kikuchi | 358/468 |
| 2010/0140362 | A1 * | 6/2010 | Tokumaru | 235/494 |
| 2011/0002012 | A1 * | 1/2011 | Amagai | 358/3.28 |
| 2012/0069408 | A1 * | 3/2012 | Tsutsumi | 358/474 |
| 2012/0111935 | A1 * | 5/2012 | Seo | 235/375 |
| 2012/0314242 | A1 * | 12/2012 | Kakutani | 358/1.14 |

FOREIGN PATENT DOCUMENTS

JP  2010-200301 A  9/2010

* cited by examiner

*Primary Examiner* — Twyler Haskins
*Assistant Examiner* — Dennis Dicker
(74) *Attorney, Agent, or Firm* — Carter, DeLuca, Farrell & Schmidt, LLP

(57) ABSTRACT

In a case of deleting a two-dimensional code for personal information protection, job control information within line two-dimensional code is deleted together, leading to being incapable of obtaining tracking information or performing job control. A control unit deletes tracking information within the extracted additional information, that is, in a case where the tracking information includes first tracking information and second tracking information, deletes the second tracking information. The control unit changes the job control information within the extracted additional information to job prohibition. An encode unit encodes the additional information to generate a two-dimensional code. When the control unit detects that a memory receives the two-dimensional code including the updated additional information and a document image, in a memory the two-dimensional code and the document image are combined to generate a document image to which the two-dimensional code is added.

9 Claims, 21 Drawing Sheets

| | | |
|---|---|---|
| 202 — FIRST TRACKING INFORMATION | FIRST OPERATOR USER ID | — 204 |
| | FIRST TIME STAMP | — 205 |
| | FIRST DEVICE INFORMATION | — 206 |
| 207 — SECOND TRACKING INFORMATION | SECOND USER ID | — 209 |
| | SECOND TIME STAMP | — 210 |
| | SECOND DEVICE INFORMATION | — 211 |
| 212 — JOB CONTROL INFORMATION | PERMISSION | — 213 |

FIG.4

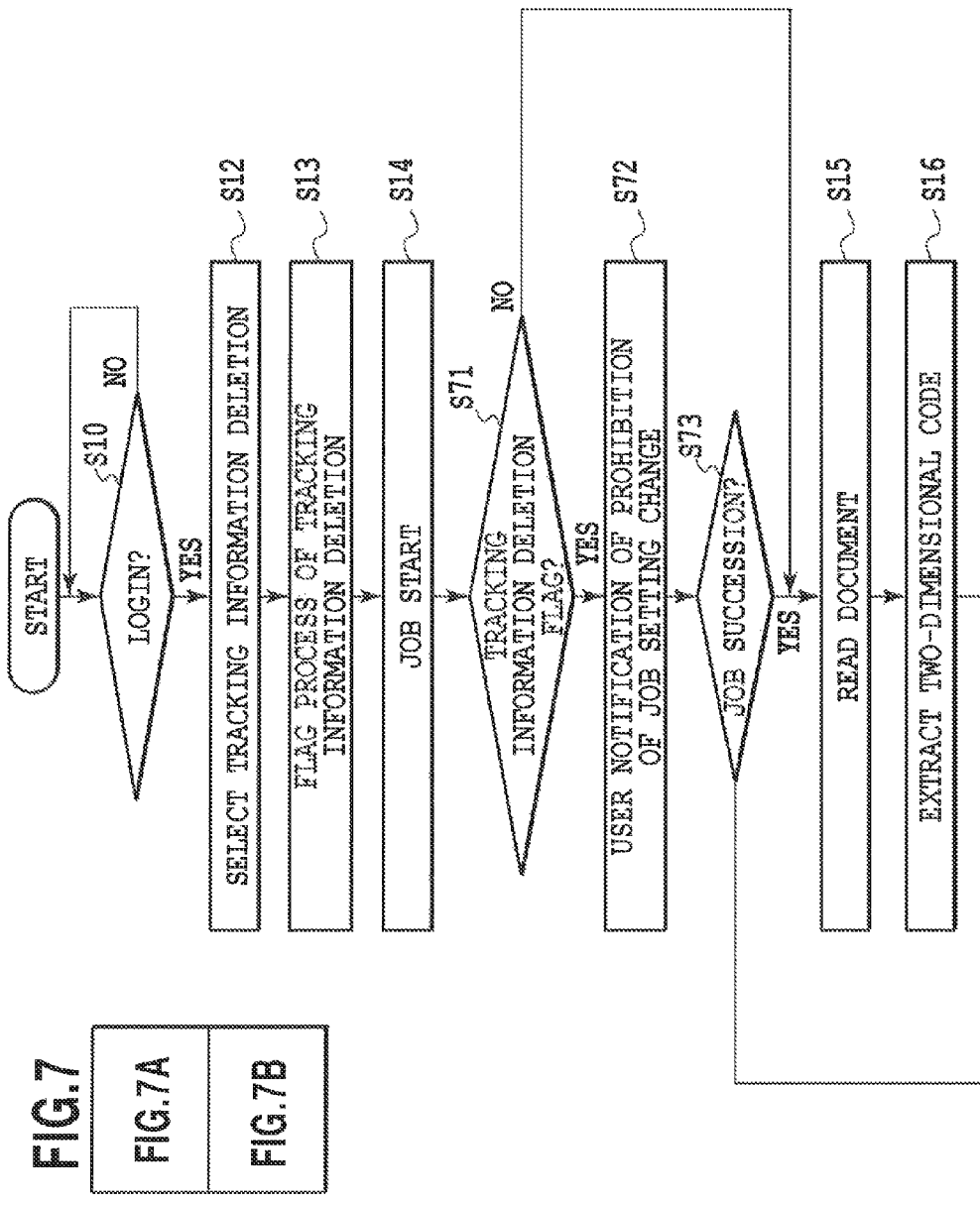

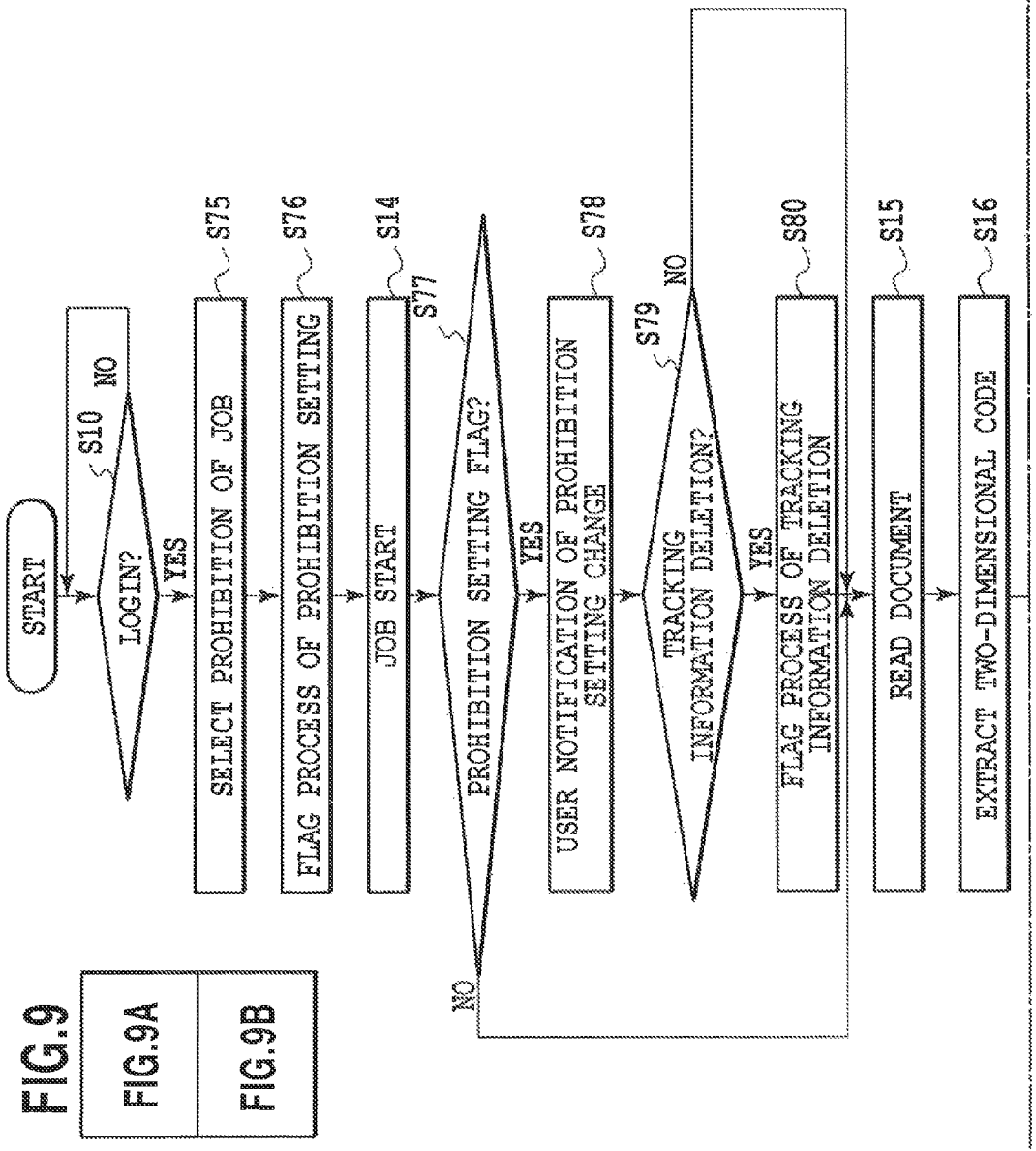

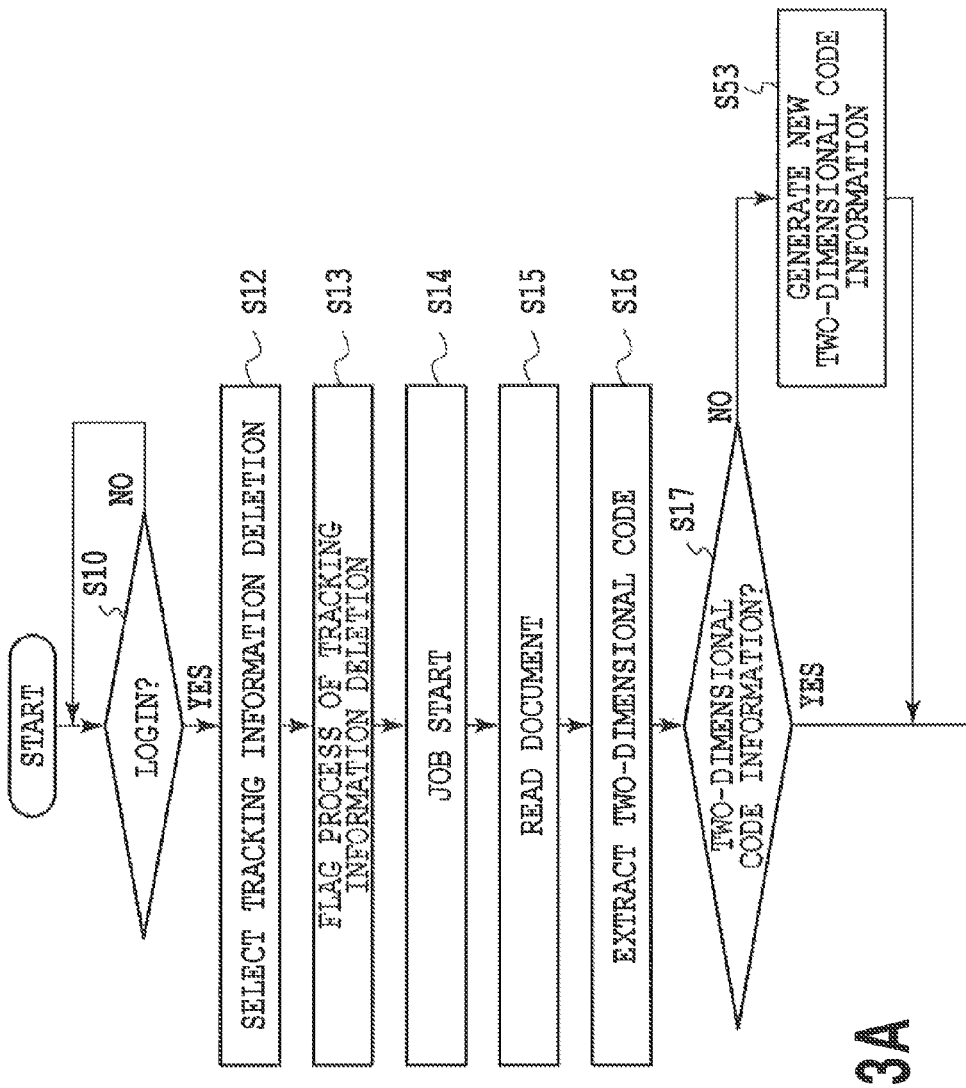

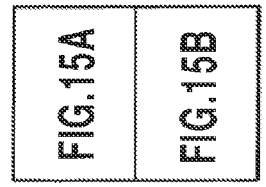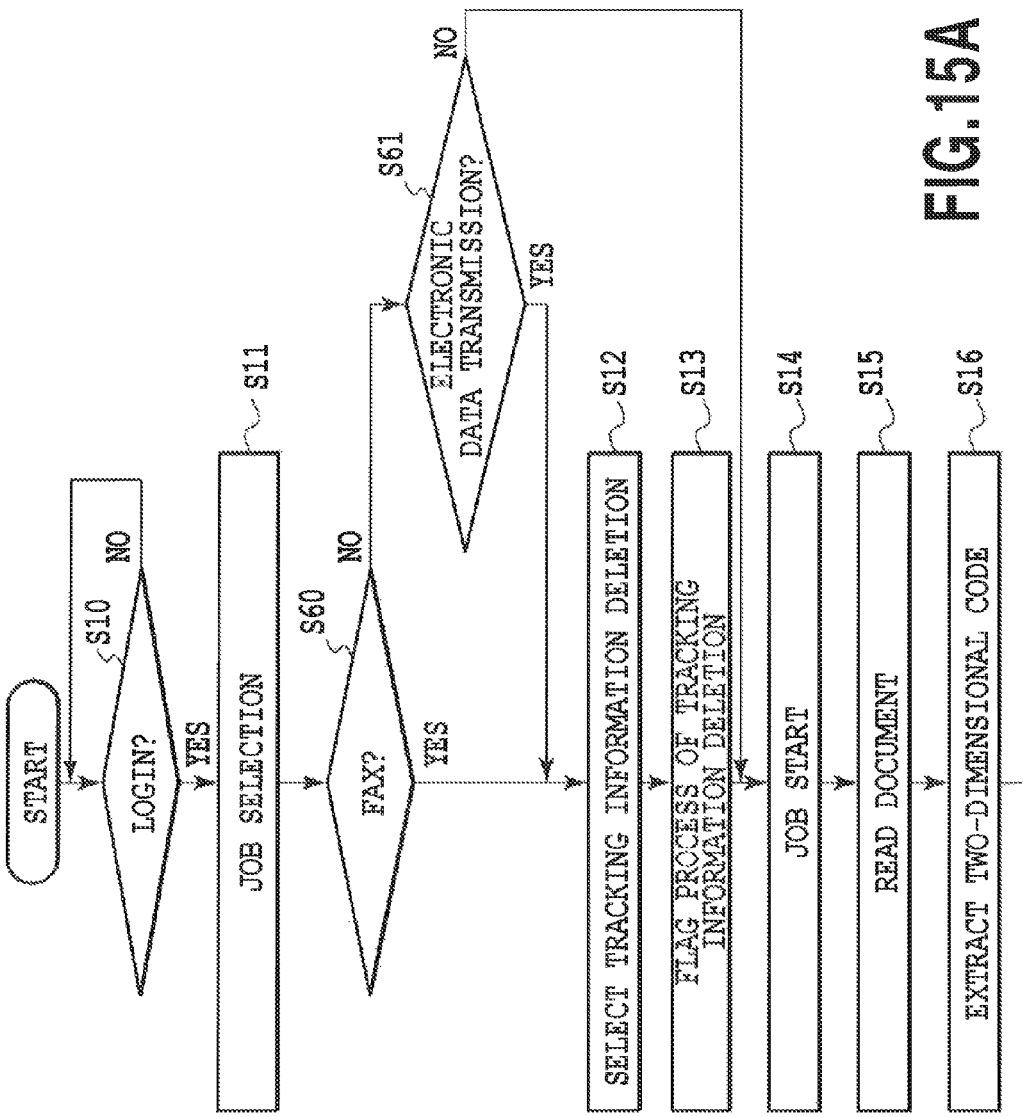

IMAGE PROCESSING DEVICE, IMAGE PROCESSING METHOD AND COMPUTER-READABLE MEDIUM

BACKGROUND OF THE INVENTION

1. Field of the Invention

This invention relates to an image processing device, an image processing method and a program, and more particularly, to an image processing device, an image processing method and a program, which can handle two-dimensional codes.

2. Description of the Related Art

In recent years, there have been proposed technologies for copy restriction and history management of documents such as printed matter due to increasing awareness of information security to the documents. For example, there are technologies in which bar codes or two-dimensional codes are added to printed matter to implement the above copy restriction or history management (for example, refer to Japanese Patent Laid-open No. 2010-200301). According to the technology disclosed in Japanese Patent Laid-Open No. 2010-200301, two-dimensional codes including output permission information or tracking information of a document are printed together with an image thereof. As a user gives an instruction of copying such printed matter to a multi function peripheral, when the two-dimensional code is checked and the output permission information is included therein, the copying is executed and the tracking information is updated, thus printing a new two-dimensional code. It should be noted that, for recording by whom and when the copying is executed, the tracking information generally includes personal information such as user ID.

However, when the technology of Japanese Patent Laid-Open NO. 2010-200301 is used, it is possible to implement the history management through the tracking information, but since the tracking information includes the personal information such as user ID, there is a possibility that the personal information is leaked from the document. Therefore, there are some cases where it is desired to delete the tracking information. In a case where the tracking information is required to be deleted in this manner, there occurs a problem that a security level of the printed matter is degraded upon simply deleting the tracking information.

SUMMARY OF THE INVENTION

An image processing device for executing a job of output based upon image data obtained by reading a document provides reader for reading a document to which a code including job control information for determining whether or not the job is permitted and tracking information having user ID is added, combining unit for extracting the added code and an image of the document excluding the added code, from the image data read by the reader, and when the job control information included in the added code indicates permission for the job, setting prohibition of the job to the job control information, generating a new code not including the tracking information and combining the new code with the extracted image of the document and output unit for outputting image data to which the new code is added as a result of the combination by the combining unit.

According to the present invention, the personal information can be deleted from the tracking information for the information security without degrading the security level to prevent leakage of the personal information.

Further features of the present invention will become apparent from the following description of exemplary embodiments (with reference to the attached drawings).

BRIEF DESCRIPTION OF THE DRAWINGS

FIG. 4 is a diagram showing a content of information included in the two-dimensional code according to the embodiment in the present invention;

FIG. 7 is a diagram showing the relationship of FIGS. 7A and 7B;

FIG. 7A is a flow chart showing a tracking information deletion process according to a second embodiment in the present invention;

FIG. 9 is a diagram showing the relationship of FIGS. 9A and 9B;

FIG. 9A is a flow chart showing a prohibition of the job setting process according to a third embodiment in the present invention;

FIG. 11 is a diagram showing the relationship of FIGS. 11A and 11B;

FIG. 13 is a diagram showing the relationship of FIGS. 13A and 13B;

FIG. 13A is a flow chart showing a tracking information deletion process according to a fifth embodiment in the present invention;

FIG. 15 is a diagram showing the relationship of FIGS. 15A and 15B;

FIG. 15A is a flow chart showing a tracking information deletion process according to a sixth embodiment in the present invention;

DESCRIPTION OF THE EMBODIMENTS

Figure 1:
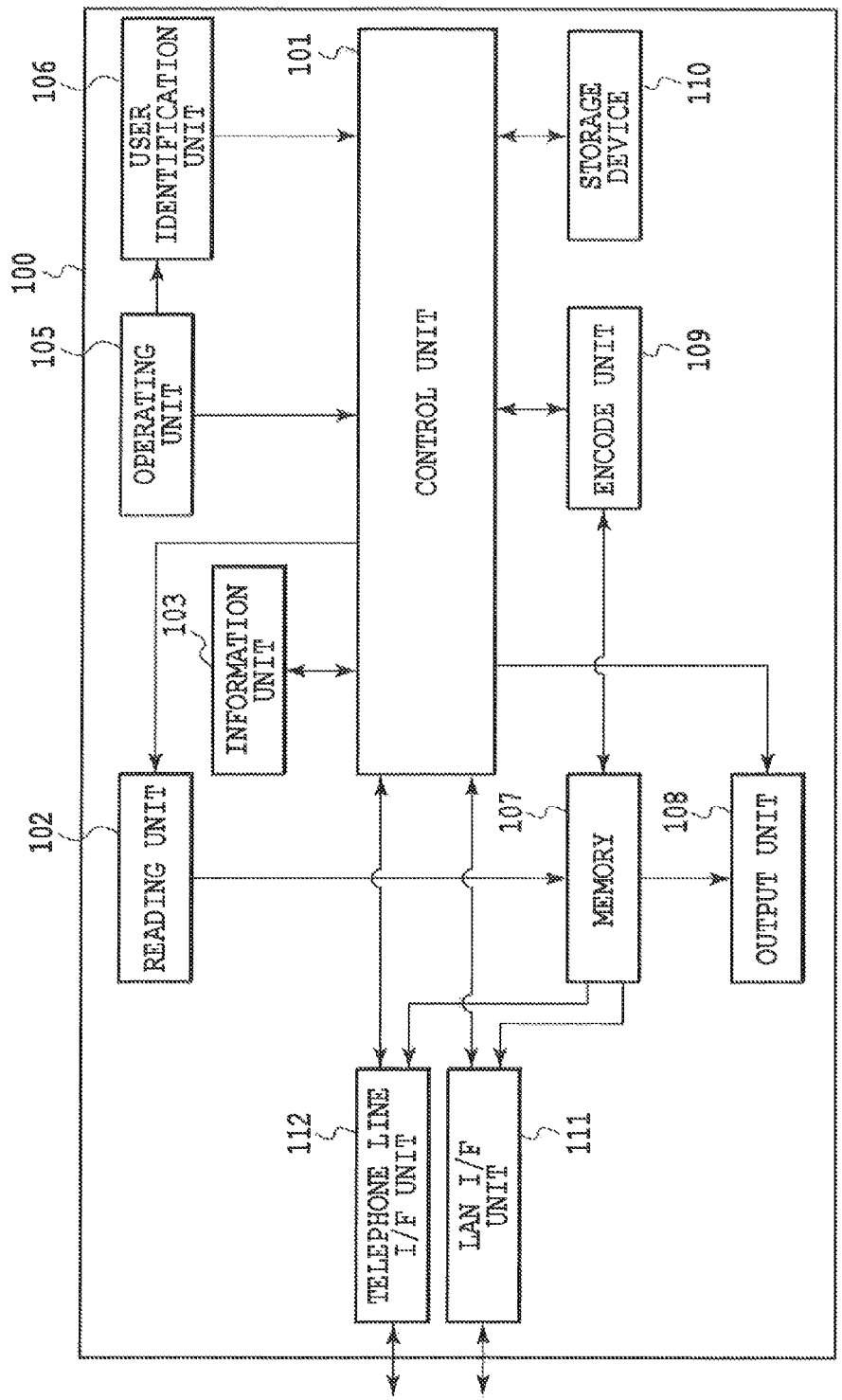
FIG. 1 is a system block diagram of an MFP 100 according to an embodiment in the present invention.

Hereinafter, the best mode for carrying out the present invention will be described with reference to the accompanying drawings. However, there is no intention that relative arrangements, expressions, numerical values and the like of elements described in the embodiments are used to limit the scope of the present invention only to the descriptions unless particularly described in a limited manner. Codes used in the figures are referred to sis identical codes in a case of showing identical elements.

[First Embodiment]

According to a first embodiment in the present invention, in a case where an instruction of deleting tracking information is given sit the time a multi function peripheral reads a document, the deletion of the tracking information is executed and also job control information is changed from output permission to output prohibition. It should be noted that an explanation will be made of the following embodiments including the present embodiment in which the event of using a two-dimensional code (the event of combining a two-dimensional code with a document image for printing, and the event of controlling a reading operation of the document obtained by the printing) is used as an example. However, the present invention is not limited thereto. In addition, in the present embodiment, one two-dimensional code is added to one surface of the document, but not limited thereto, the present invention may adopt any method known in the present technical field.

First, the process of adding a two-dimensional code to a document will be explained. In the present embodiment, the two-dimensional code is obtained by encoding tracking information and job control information. Hereinafter, a combination of two pieces of the tracking information and the job control information is referred to as additional information. The two-dimensional code is generated by encoding the additional code. A combined document image is generated by combining the generated two-dimensional code with a document linage. The combined document in age in which the two-dimensional code and the document image are combined is printed. Thereby the document in which the additional information is combined as the two-dimensional code is produced. The process of combining the two-dimensional code with the document image is called "addition" of the two-dimensional code. The process of encoding the additional information as the two-dimensional code is called "generation" of the two-dimensional code.

Next, the process of extracting the additional information from the document to which the two-dimensional code is added will be explained. The document to which the two-dimensional code is added is placed on a scanner document table or is delivered by an ADF (Auto Document Feeder) for reading, thus generating a document image. The two-dimensional code is detected from the generated document image. The detected two-dimensional code is decoded to obtain the additional information. Here, among a series of the processes, the process of detecting the two-dimensional code from the generated document image for decoding is called "extraction" of the additional information.

Hereinafter, the construction of a network multi function peripheral. MFP 100 in the present embodiment will be in detail explained with reference to FIG. 1. Here, FIG. 1 is a block diagram exemplifying the construction of the MFP 100 according to the present embodiment. A control unit 101 performs operation control of each unit in the MFP 100. The control unit 101 has a CPU (Central Processing Unit) (not shown). An operating unit 105 receives operating input from a user to the MFP 100.

A user identification unit 106 manages information required for identification of a user using the MFP 100. A detailed operation of the user identification unit 106 will be described later. A reading unit 102 reads (for example, scans) the aforementioned document to generate a document image of the document. It should be noted that the document is used as an element meaning a paper such as printed matter or a document outputted in a print material, and the document image is used as an element meaning digital data.

An information unit 103 detects the two-dimensional code from the aforementioned document image and decodes the two-dimensional code. A memory 107 stores the document image. An output unit 108 reads the document image from the memory 107 for printing. A LAN I/F unit 111 and a telephone line I/F unit 112 perform sending or receiving of the document image to or from an external device. Here, the external device means a PC connected via a network to the MFP 100, a facsimile device or an MFP connected via a telephone line to the MFP 100, or the like, but is not limited thereto. A storage device 110 stores print settings, job logs, tracking information and the like of the MFP 100. It should be noted that the storage device 110 may be provided inside the MFP 100 or in an external device connected to the MFP 100 by a network. An encode unit 109 performs encoding of additional information.

Next, an operation performed by a user and the process executed by the MFP 100 in response to the operation in a case of adding the additional information will be explained. A user who desires an addition of a two-dimensional code to a document first inputs user ID and a pass word through the operating unit 105 according to a user identification screen (not shown) displayed in the operating unit 105. The input of the user ID, the pass word and the like may be made using a magnetic card without via the operating unit 105, which may be used at the user identification unit 106. The information inputted via the operating unit 105 or the like is sent from the operating unit 105 to the user identification unit 106. The user identification unit 106 determines whether or not the inputted pass word is a correct pass word according to the managed information. In a case where the pass word is the correct pass word as a result of the determination, the user identification unit 106 transmits the determination result that the pass word is the correct pass word and the user ID to the control unit 101.

Figure 2:
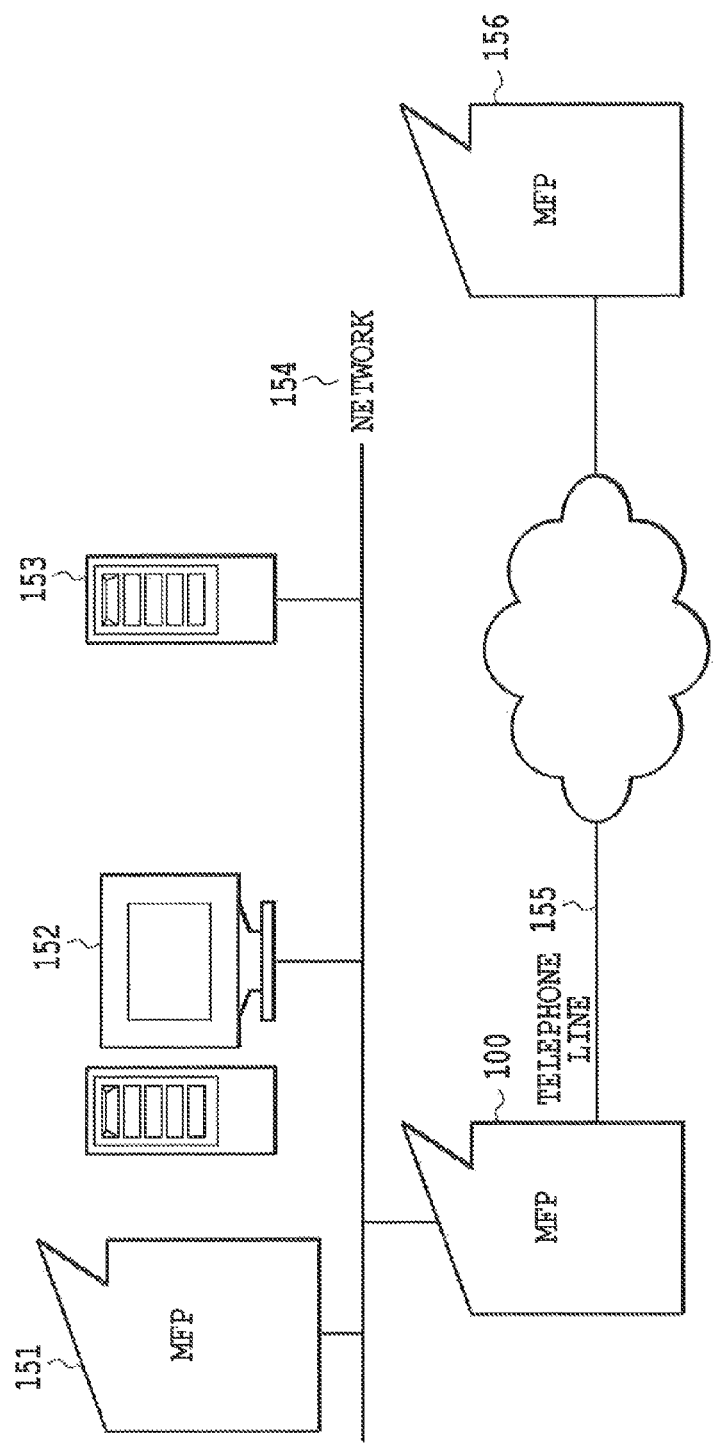
FIG. 2 is a diagram showing a system environment of the embodiment in the present invention.

FIG. 2 is a diagram showing an environment in which the MFP 100 is connected. The MFP 100 is connected via a network 154 to an MFP 151, a PC 152, a data base 153 and the like. Further, the MFP 100 is connected via a telephone line 155 to an MFP 156. The MFP 156 is not limited to the MFP, and so long as a device can be connected to a telephone line, such sis a facsimile device, any device known in the present technological filed can be used.

Figure 3:
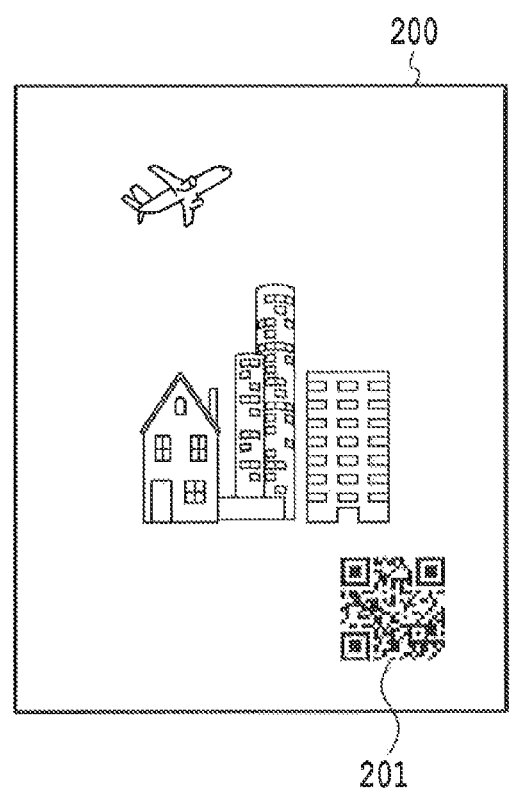
FIG. 3 is a diagram showing an example of a document image in which one two-dimensional code is included according to the embodiment in the present invention.

FIG. 3 is an example of a document to which a two-dimensional code is added, and shows that a two-dimensional code 201 in which additional information is encoded is added to a document 200. Next, the additional information will be explained with reference to FIG. 4.

FIG. 4 shows the additional information in the present embodiment, that is, information included in the two-dimensional code added to the read document. First tracking information 202 includes first user ID 204, a first time scamp 205 and first device information 206. The first user ID 204 indicates user ID of a user who has performed an operation of copying, sending or the like of a document. The first time stamp 205 indicates date and time in which copying or sending of a document has been performed. The first device information 206 indicates information of a device which has performed an operation of copying, sending or the like of a document (for example, information including identification information which can specify a device, such as a serial number of the device).

Similarly, second tracking information 207 includes second user ID 209, a second time stamp 210 and second device information 211. The second user ID 209 indicates user ID of a user who has performed an operation of copying, sending or the like of a document. The second time stamp 210 indicates date and time in which copying or sending of a document has been performed. The second device information 211 indicates information of a device which has performed an operation of copying, sending or the like of a document (for example, information including identification information which can specify a device, such as a serial number of the device). Job control information 212 is information regarding control of a job such as copying or printing of a document, for example, information that the copying or printing of the document is prohibited or possible (permitted), but is not limited thereto. In the present embodiment, the job relates mainly to the copying or printing of the document, and the job control information corresponds to the information of any of "prohibition" or "permission" (possible) of copying or printing, but may correspond to job control information of a job seen as sending known in the present technological field or other jobs.

Next, the tracking information is generated as follows. In regard to operator ID, login user ID inputted at the time of performing user identification in a case where an operator makes a copy or the like can be used. The time stamp is determined based upon time managed in the MFP 100, for example. The device information can be used by reading a serial number of a device determined at factory shipment or bender information from the inside of the MFP 100, for example. Next, a difference between the first tracking information 202 and the second tracking information 207 will be explained. The first tracking information 202 is information generated at the time a two-dimensional code is first generated and added. In the first tracking information 202, the data is not rewritten even if the document including this information is copied or printed, and the same original information is retained. That is, the first tracking information is read upon copying or printing the document, but the first tracking information originally included is used as it is to additional information added to the document outputted as a result. On the contrary, in the second tracking information, new information is generated and added each time of copying or printing the document. The event that the additional information is thus rewritten at the time of copying or printing the document is called update of additional information. The update of the additional information will be in detail described. The update of the additional information in the present embodiment is executed in two pieces of information of the second tracking information 207 and the job control information 212. The update of the job control information 212 is generally executed in a case where there is an instruction thereof from a user. On the other hand, the update of the second tracking information 207 is executed each time a job is performed since the time stamp is different and an operator performing an instruction of the job is usually different. In addition, a case where data exists in the second tracking information 207 and a case where it does not will be explained. In a case where the second tracking information 207 does not exist, the present tracking information in regard to the job (for example, user ID and the like) is newly written matching up to the format. In a case where the second tracking information 207 already exists, the already written information is deleted and then, new information is written. The job control information 212 indicates information included in the two-dimensional code added to the read document, wherein permission 213 indicates output permission, and the device will execute the process of copying or printing determining that the output is permitted. The job control information 212 generally includes permission indicating that the process according to a job is possible, and prohibition indicating that the process indicated in a job is not possible.

In the present embodiment, in a case where the MFP 100 reads a document, it is determined based upon an instruction of an operator whether or not deletion of tracking information is performed. In a case where the deletion is instructed, the deletion or the tracking information included in the additional information of the read document is performed. Here, only by deleting the tracking information, the history management and the like of the document can not be made, thus leading to degradation of the security level. Therefore, the tracking information is deleted, and along with it, the job control information is rewritten for maintaining the security level. That is, the job control information is changed from output permission to output prohibition, and this operation will be in detail explained with reference to a flow chart in FIG. 5.

The user identification unit 106 performs user identification using the user ID and the pass word inputted from the operating unit 105 (step S10). In a case where it is determined that the user identification is matched, a selection whether or not the deletion of the tracking information is performed is displayed on a display screen of the operating unit 105 (step S12) to enable input of an instruction from a user. The control unit 101 executes the process of a tracking information deletion flag based upon the result of the tracking information deletion selection of the ten S13). In the tracking information deletion flag process, for example in a case where the instruction of the tracking information deletion is received, a flag of "1" is raised, and in a case where the instruction of the tracking information deletion is not received, a flag of "0" is raised. Here, if presence/absence of the instruction of the tracking information deletion can be clearly determined, the method of raising the flag is not limited, thereto, but in the following description, the flag will be explained as "1" in a case where the instruction is received, and as "0" in a case where the instruction is not received.

When a job start instruction (step S14) is received by the operating unit 105 from a user, the control unit 101 gives an instruction to the reading unit 102 to read a document and generate a document image. The control unit 101 sends the generated document image so the memory 107 and the information unit 103 (step S15). Next, the control unit 101 gives an instruction to the information unit 103 in such a manner as to extract additional information from the document image (step S16), and determines whether or not the additional information can be extracted from the document image as a result of the decoding in the information unit 103 (step S17).

At step S17, in a case where the control unit 101 determines that the additional information is extracted from the document information, the process goes to step S18, and in a case where the control unit 101 determines that the additional information is not extracted, the process goes to step S25.

At step S17, it is determined whether or not the job control information exists in the extracted additional information and it is determined whether or not, in a case where it does, the job control information is prohibition of the job (step S18). When it is determined at step S17 that the job control information is the prohibition of the job, the process goes to step S27. At step S18, when the control unit 101 determines that the job control information exists and determines that the permission for the job (output permission) exists, the control unit 101 determines a content of the flag of the tracking information deletion (step S19). At step S19, when the tracking information deletion flag is determined as "1", the process goes to step S20, and when the tracking information deletion flag is determined as "0", the process goes to step S26.

At step S20, the tracking information within the additional information extracted by the control unit 101, that is, at the time of including the first tracking information and the second tracking information, the second tracking information is deleted. Next, the control unit 101 changes the job control information within the extracted additional information to prohibition of the job (step S21). Thereafter, an encode unit 109 generates a two-dimensional code by encoding the additional information (step S22). When the control unit 101 detects that the memory 107 receives the two-dimensional code including the updated additional information and the document image, in the memory 107 the two-dimensional code and the document image are combined to generate a document image to which the two-dimensional code is added (step S23). Next, the control unit 101 sends the document image, to which the two-dimensional code is added, from the memory 107 to an output unit 108, which is outputted from the output unit 108 (step S24).

Figure 6:
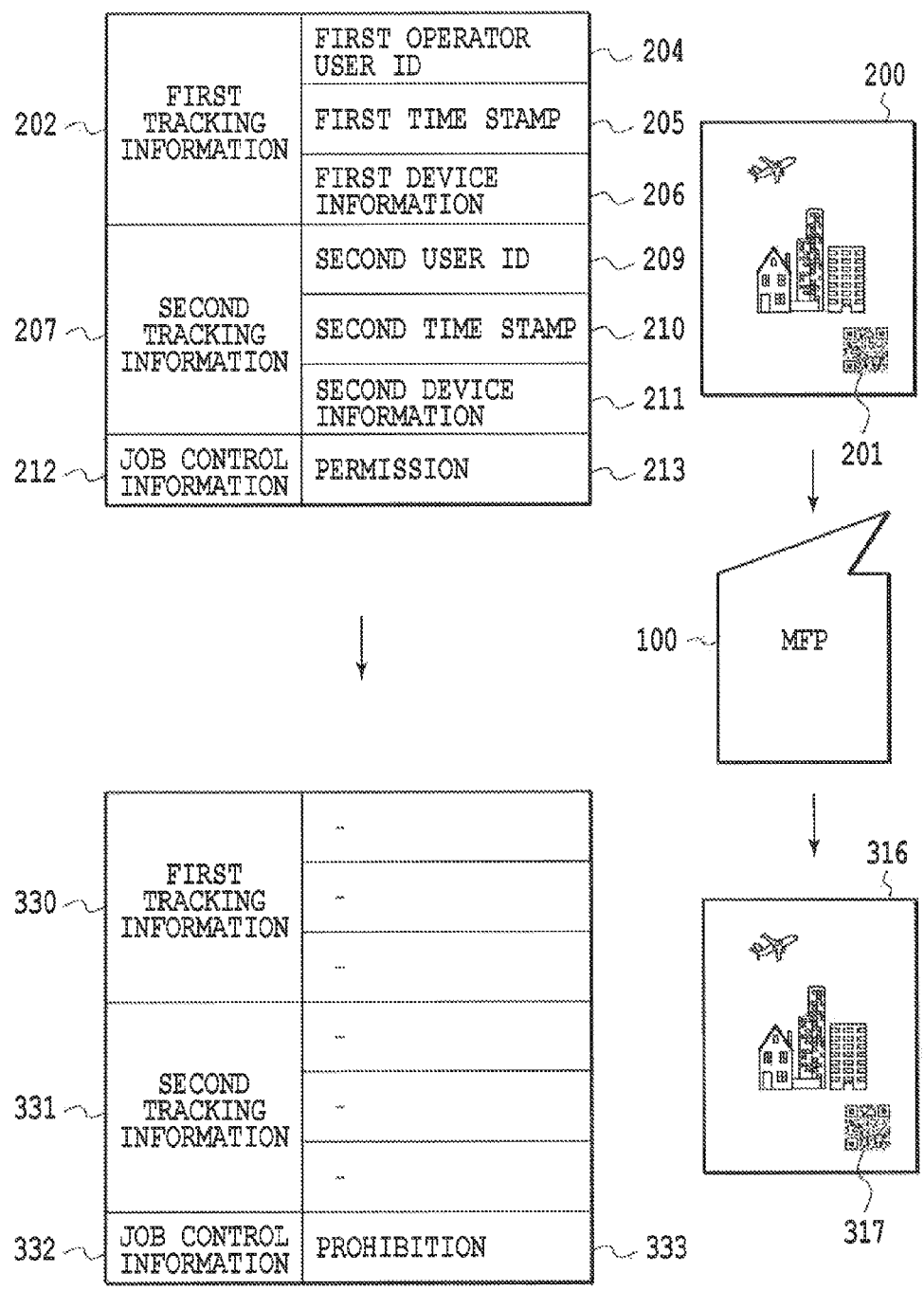
FIG. 6 is a diagram showing an updated situation of information included in the two-dimensional code according to the first embodiment in the present invention.

FIG. 6 is a diagram showing an updated situation of information included in the two-dimensional code of the present embodiment. As shown in FIG. 6, the two-dimensional code added to a document 200 originally includes the first tracking information 202, the second tracking information 207 and the job control information 212. The MFP 100 having read the document 200 outputs a document 316 to which a two-dimensional code 317 is added. By executing the process in the present embodiment, the two-dimensional code 317 results in including first tracking information 330 and second tracking information 331 each having no information, and job control information 332 of "prohibition".

On the other hand, at step S17, in a case where the additional information can not be extracted, the control unit 101 generates additional information with aforementioned method, for example, and the encode unit 109 encodes the generated additional information to generate a two-dimensional code (step S25). Here, since the two-dimensional code is not added to the document, the generated two-dimensional code includes only the tracking information in regard to this job. Therefore, the first tracking information only is included as the tracking information. In this manner, the two-dimensional code to be generated may be set based upon the information instructed by the operating unit 105 or may be generated corresponding to a predetermined setting stored in the memory 107 or the storage device 110. At step S25, after the two-dimensional code is newly generated, the process goes to step S23, wherein the two-dimensional code and the document image are combined as described above.

At step S18, in a case where the control unit 101 determines the job control information as "prohibition", the control unit 101 executes a cancellation process or the job in the middle of the operating (step S27) to terminate the process in the present embodiment.

At step S19, in a case where the flag is determined as "0", the control unit 101 updates the additional information with any of methods known in the present technological field (step S26), and the process goes to step S22, wherein the additional information is encoded to the two-dimensional code, and the combination and the output process are executed as described above. That is, the details are omitted, but second tracking information is generated by information of an operator, a time stamp, a device and the like in regard to the present job, and the second tracking information of the read additional information is rewritten thereby. A two-dimensional code is generated based upon the rewritten additional information.

As described above, in the present embodiment, in a case where an instruction of deleting the tracking information is given at the time the multi function peripheral reads a document, the deletion of the tracking information is performed and the job control information is changed from the output permission to the output prohibition. Thereby, the personal information can be deleted from the tracking information for the information security without degrading the security level to prevent leakage of the personal information.

[Second Embodiment]

In regard to a second embodiment in the present invention, a difference from the first embodiment will be explained. In the first embodiment, the multi function peripheral reads a document, deletes the tracking information within the additional information, and changes the job control information to the prohibition of the job, which is outputted. In the second embodiment, the event that the job control information will be changed to the prohibition of the job is notified to a user at tracking information deleting, and the process is executed in response to an instruction of the user. Hereinafter, mainly the difference from the first embodiment will be explained.

Figure 7B:
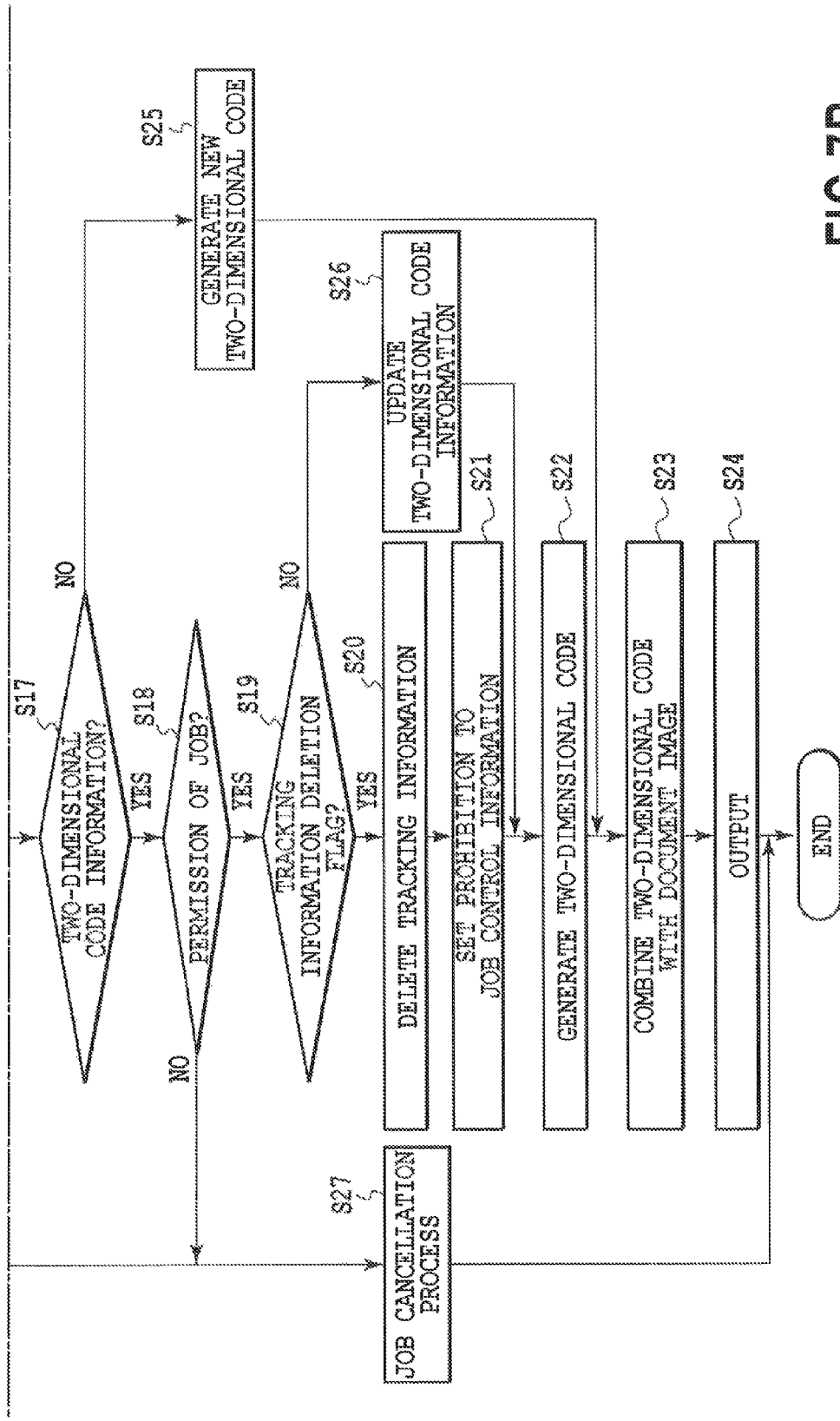
FIG. 7B is a flow chart showing a tracking information deletion process according to a second embodiment in the present invention.

FIGS. 7A and B are diagrams showing a process flow according to the second embodiment in the present invention. Step S10 to step S27 show the processes identical to those in FIG. 5. That is, step S10 to step S14 execute the processes similar to those in FIG. 5. At step S14, when an instruction of a job start is received from the operating unit 105, a content of a tracking information deletion flag is first determined at this point (step S71). In a case where it is determined at step S71 that the flag is determined as "1", the process goes to step S72, and in a case where it is determined at step S71 that the flag is determined as "0", the process goes to step S15. The following processes are the same as those in the first embodiment.

Figure 8:
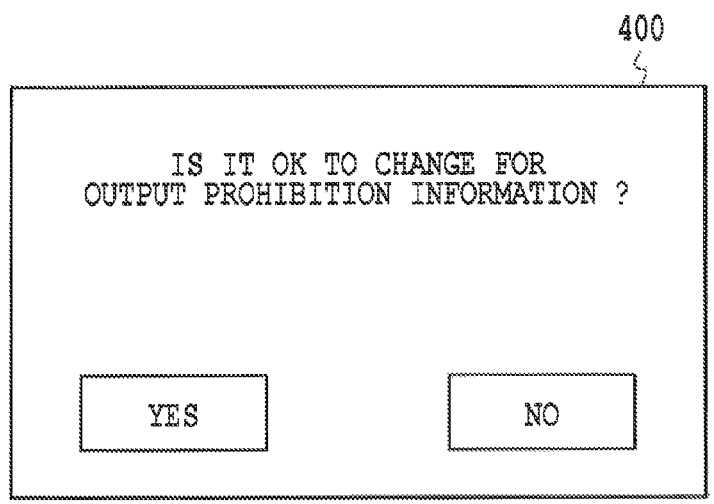
FIG. 8 is a diagram showing an example of an operating unit display according to the second embodiment in the present invention.

At step S72, when the tracking information deletion is instructed, the event that the job control information will be changed to the prohibition of the job is notified to a user through the operating unit 105. FIG. 8 shows an example of a display screen displayed in the operating unit 105. When an instruction of continuing to do the job is received from a user (step S73), the process goes to step S15, and when an instruction of cancelling the job is received, the process goes to step S27. After going to step S15 or step S27, an operation similar to that in the first embodiment is performed.

As described above, in the present embodiment the event that the job control information will be changed to the prohibition of the job setting at tracking information deleting is notified to a user, and the process is executed in response to the instruction of the user. Thereby, the personal information can be deleted from the tracking information for the information security based upon the determination of the user without degrading the security level to prevent the leakage of the personal information.

[Third Embodiment]

A difference of the present embodiment from the first embodiment will be explained. In the first embodiment, the multi function peripheral reads the document, the tracking information within the additional information is deleted, and the job control information is changed to the prohibition of the job information, which will be outputted. In the third embodiment, in a case where there is provided prohibition instruction input of changing the additional information to the prohibition of the job setting, the event that it is possible to set deletion or the tracking information is notified to a user and the process is executed in response to an instruction of the user.

Figure 9B:
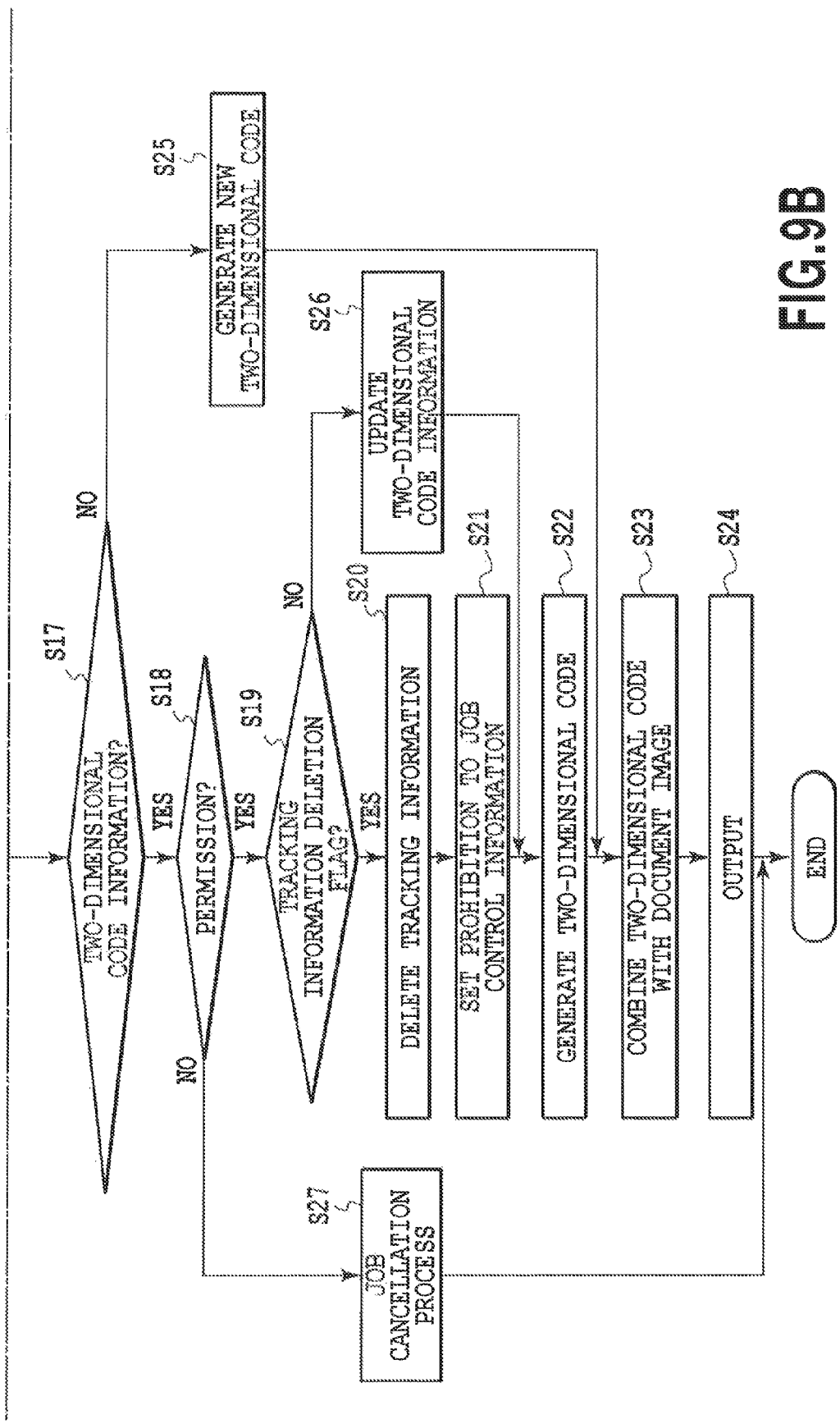
FIG. 9B is a flow chart showing a prohibition of the job setting process according to a third embodiment in the present invention.
Figure 10:
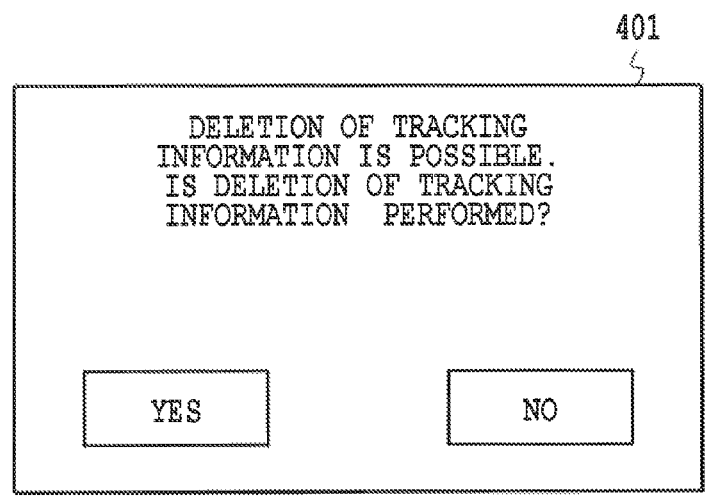
FIG. 10 is a diagram showing an example of an operating unit display according to the third embodiment in the present invention.

FIGS. 9A and B are diagrams showing a process flow according to the third embodiment in the present invention. Step S10 and step S13 to step S27 show the processes identical to those in FIG. 5. The user identification unit 106 performs user identification based upon user ID and a pass word inputted from the operating unit 105 (step S10). In a case where it is determined that the user identification is matched, a display screen as shown in FIG. 10 is displayed in the operating unit 105 to enable selection of prohibition of the job from a user (step S75). The control unit 101 executes the process of a prohibition of the job setting flag based upon the result of the prohibition of the job selection from a user (step S76).

In the flag process, for example in a case where the instruction of the tracking information deletion is received, a flag of "1" is raised, and in a case where the instruction of the tracking information deletion is not received, a flag of "0" is raised. Here, this flag process is executed in the same way with step S13 in FIG. 5, and if the instruction of the tracking information deletion can be clearly determined, the method of raising the flag is not limited thereto, but in the following description, the flag will be explained as "1" in a case where the instruction is received, and as "0" in a case where the instruction is not received. When a job start instruction (step S14) is received by the operating unit 105 from a user, the control unit 101 makes a determination on the prohibition of the job flag (step S77). At step S77, in a case where the control unit 101 determines that the flag is "1", the process goes to step S78, and in a case where the control unit 101 determines that the flag is "0", the process goes to step S15.

At step S78, in a case of changing the additional information to the prohibition of the job setting, the event that the deletion of the tracking information is possible is notified to a user through the operating unit 105. FIG. 10 shows an example of a display screen displayed in the operating unit 105. Thereafter, in a case where an instruction of deleting the tracking information is received from a user, the process goes to step S80 based upon determining that deletion instruction input is received, and in a case where an instruction of not deleting the tracking information is received, the process goes to step S15 (step S79). "1" is set to the tracking information deletion flag at step S80. After that, the process goes to step S15. After going to step S15, an operation similar to that in the first embodiment is performed.

As described above, according to the present embodiment, in a case of changing the additional information to the prohibition of the job setting, the event that it is possible to set deletion of the tracking information is notified to a user, and the process is executed in response to an instruction of the user. Thereby, the personal information can be deleted from the tracking information for the information security based upon the determination of the user without degrading the security level to prevent the leakage of the personal information.

[Fourth Embodiment]

A difference of the present embodiment from the first embodiment will be explained. In the first embodiment, the multi function peripheral reads the document, the tracking information within the additional information is deleted, and the job control information is changed to the prohibition of the job information, which will be outputted. In the fourth embodiment, the tracking information which has been scheduled to be updated based upon the user identification data is generated at tracking information deleting, and the generated tracking information is associated with scan data, which is stored in the data base. Along with it, any document ID for specifying a document is written in the additional information, which enables retrieval of the tracking information from the output document. Hereinafter, mainly the difference from the first embodiment will be explained.

Figure 11A:
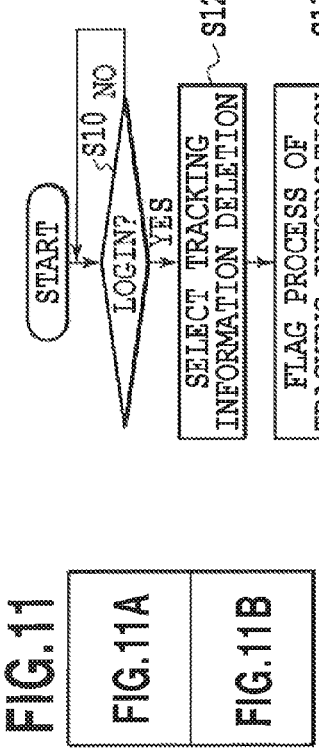
FIG. 11A is a flow chart showing a data storage process at tracking information deleting according to a fourth embodiment in the present invention.
Figure 11B:
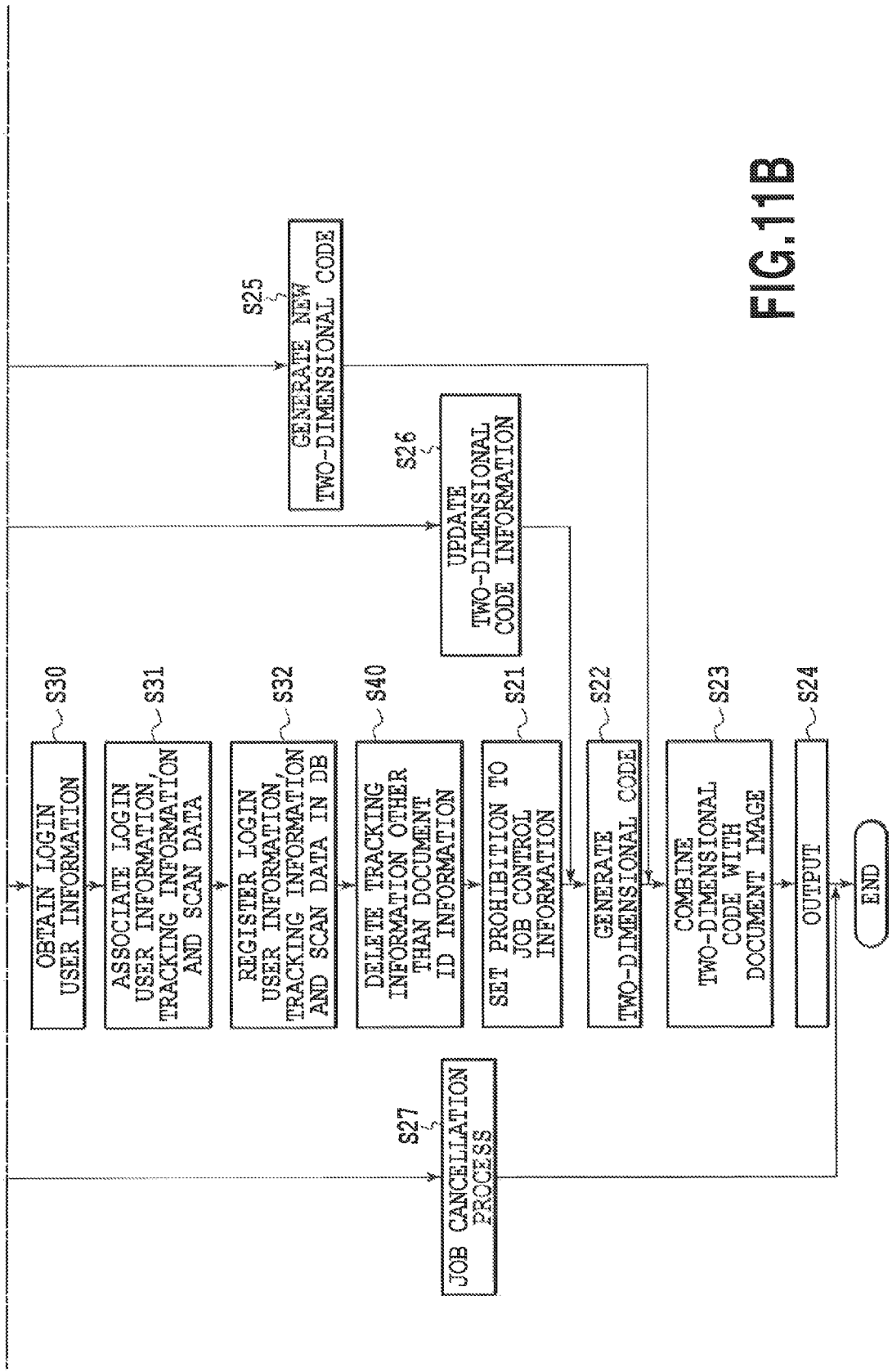
FIG. 11B is a flow chart showing a data storage process at tracking information deleting according to a fourth embodiment in the present invention.
Figure 12:
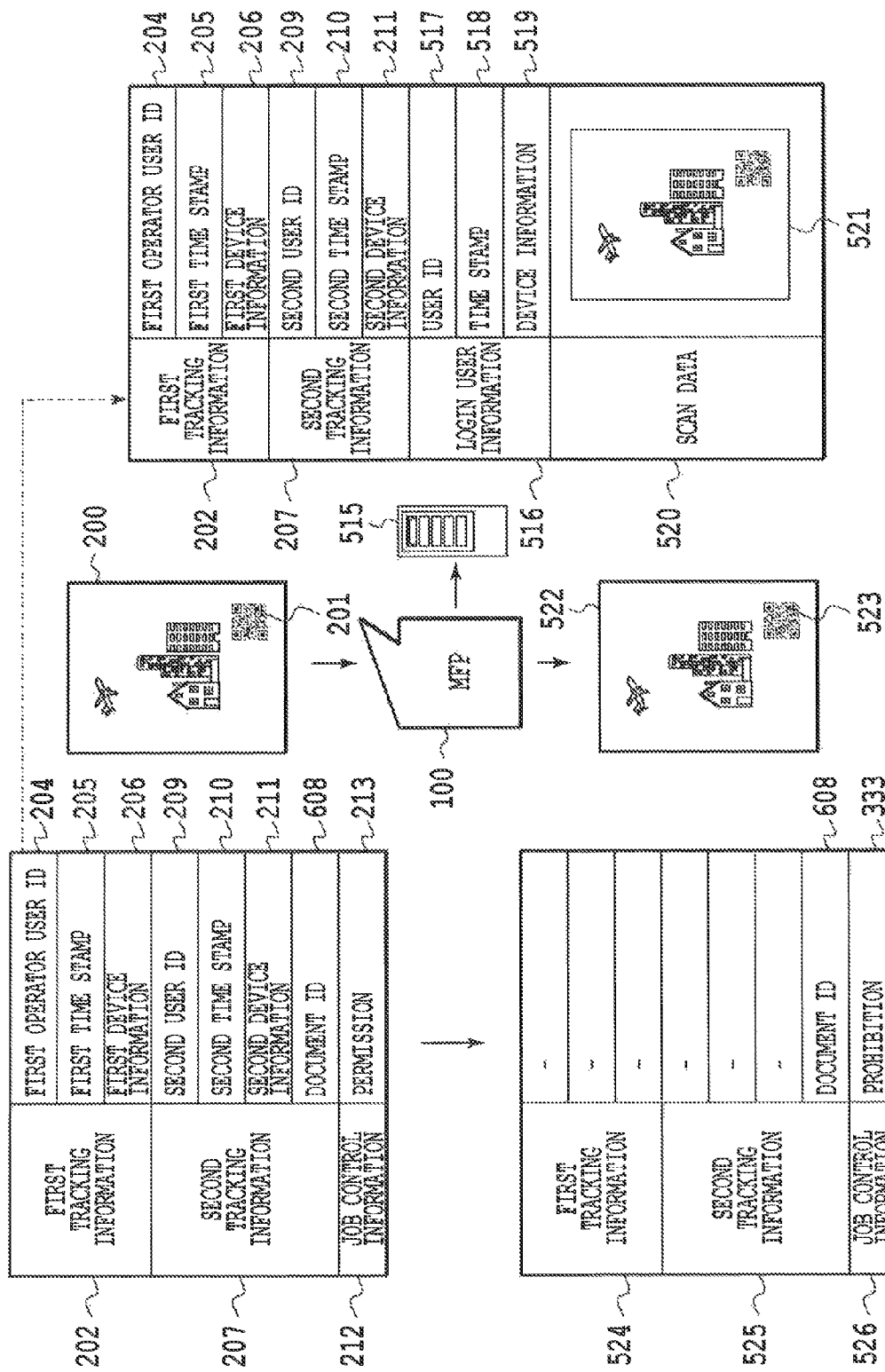
FIG. 12 is a diagram showing an updated situation and storage data of information included in a two-dimensional code according to the fourth embodiment in the present invention.

FIGS. 11A and B are flow charts showing a process flow according to the fourth embodiment in the present invention. FIG. 12 is an example of storage data into a data base 515 and. additional information of output data. Step S10 to step S19 and step S21 to step S27 show the processes identical to those in FIG. 5. That is, step 10 to step S19 execute the processes similar to those in FIG. 5, and when the control unit determines at step S19 that the tracking information deletion flag is "1", the process goes to step S30. At step S30, based upon login information obtained in the user identification unit 106, login user information having the same content as the tracking information to be updated in a case where the tracking information is not deleted is generated by the control unit 101 (step S30).

In the present embodiment, the login user information to be generated is the same as the tracking information, but, is not limited thereto, can include information other than the device information and the time stamp. If a storage format or the like of information is usable in the same way with that in the tracking information, any information may be used as the login user information. The process of associating the generated login user information with image data retained in the memory 107 is executed by the control unit 101 (step S31).

The associated login user information is sent via the LAN I/F unit 111 to the data base 515 together with the first and second tracking information included in the additional information and the job control information for data registration (step S32). If management and storage of the data are possible, the data may be registered in the storage device 110 (HDD) in the MFP 100 without transmitting the data to the data base 515. After step S32, the process goes to step S40. Here, in the present embodiment, as shown in FIG. 12 specific document. ID 608 which can specify a document is designed to be included in the second, tracking information 207. The document IE 608, if the document can be specified indiscriminatorily, may use any ID, and may be included in an appropriate location as needed corresponding to a system without being included in the second tracking information 207. In addition, the document ID 608 can be used for association with the login user information.

At step S40, the control unit 101 deletes the tracking information other than the document. ID 608 in the extracted additional information and changes the job control information in the extracted additional information to prohibition of the job 333 (step S21), and the following operations are the same as in the first embodiment.

FIG. 12 is a diagram showing an updated situation of the information within the two-dimensional code in the present embodiment. As shown in FIG. 12 the two-dimensional code 201 added in the document 200 originally includes the first tracking information 202, the second tracking information 207 (including document ID 608) and the job control information 212. The MFP 100 which has read the document 200 outputs a document 522 to which a two-dimensional code 523 is added. When the process in the present embodiment is executed, the two-dimensional code 523 results in including first tracking information 524 having no information, second tracking information 525 in which the information other than document ID 608 is deleted, and job control information 526 of "prohibition". Further, the first tracking information 202, the second tracking information 207, the login user information 516, and the scan data 520 in the additional information added to the document 200 are associated with each other, which are stored in the data base 515. Here, the login user information 516 is information composed of user ID 517, a time stamp 518, device information 519, and the like, but is not limited thereto.

As described above, in the present embodiment, in a case of changing the additional information to the prohibition of the job setting, the tracking information which has been scheduled to be updated based upon the user identification data is generated at tracking information deleting, and the generated tracking information is associated with the scan data, which is stored in the data base. Further, along with it, any document ID for specifying a document is written in the additional information, which enables retrieval of the tracking information from the output document. Therefore, the personal information can be deleted without degrading the security level to prevent leakage of the personal information. It should be noted that in the present embodiment, the storage of the tracking information into the data base and the writing of the document ID both are executed, but not limited thereto, the storage of the data base and the writing of the document ID respectively may be independently executed.

[Fifth Embodiment]

A difference of the fifth embodiment in the present invention from the first embodiment will be explained. In the first embodiment, the multi function peripheral reads the document, the tracking information within the additional information is deleted, and the job control information is changed to the prohibition of the job information, which will be outputted. In the fifth embodiment, document ID for specifying a document is set to characters upon deleting the tracking information and the document in which the document ID is added in such a manner as to be readable and understandable by a user is outputted, and therefore, the retrieval of the tracking information can be performed even from the output document.

Figure 5:
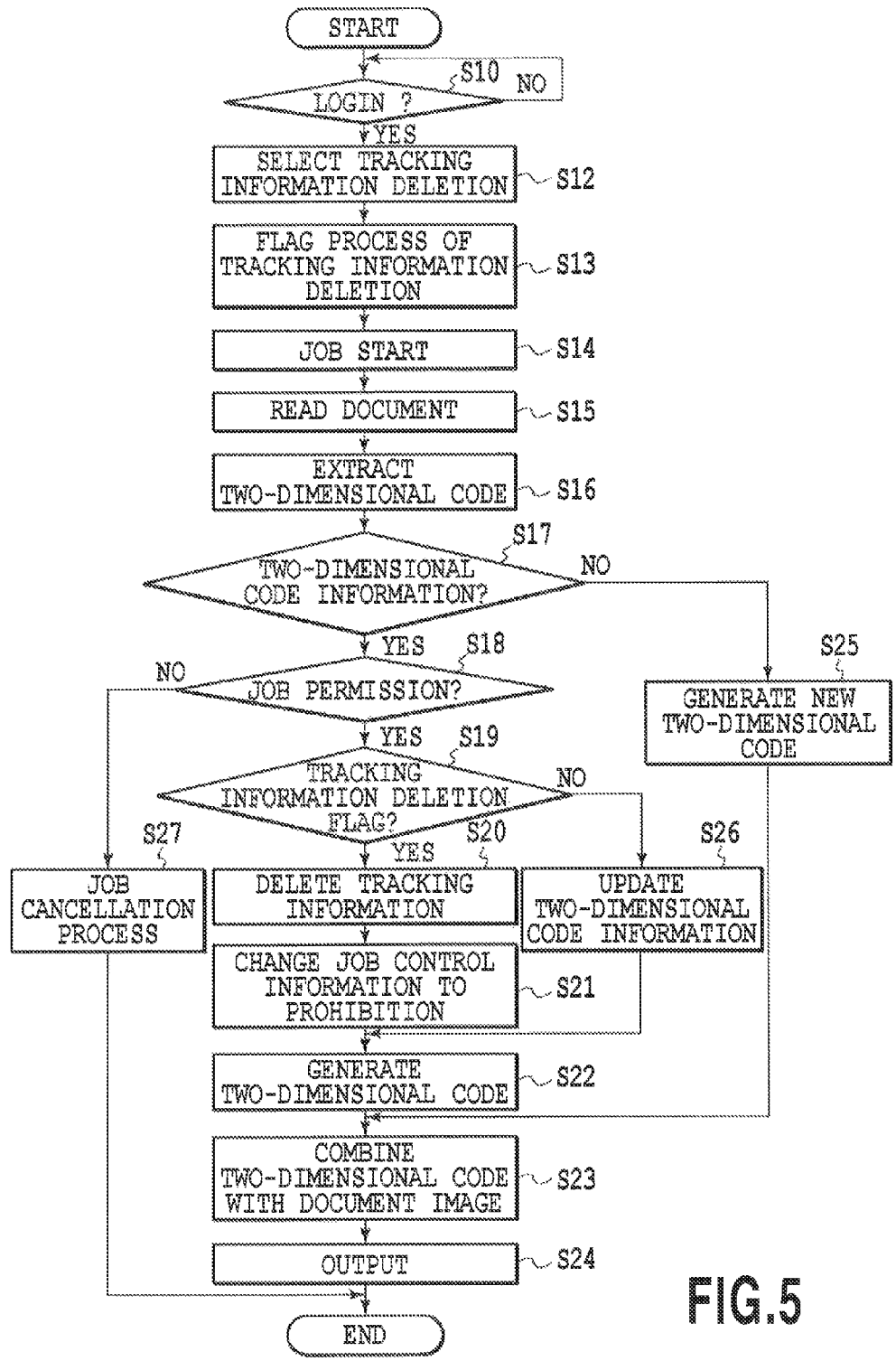
FIG. 5 is a flow chart showing a tracking information deletion process according to a first embodiment in the present invention.
Figure 13B:
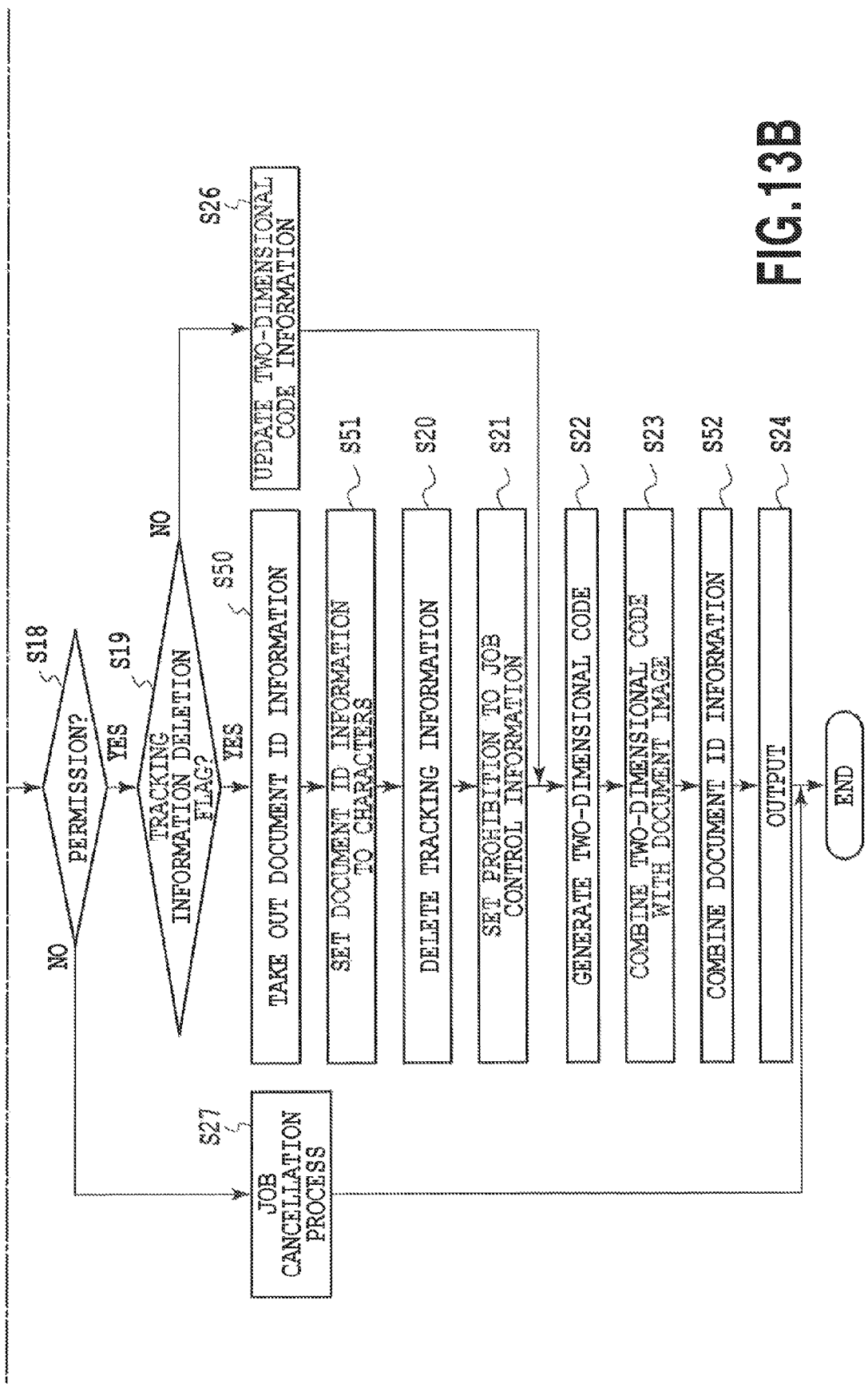
FIG. 13B is a flow chart showing a tracking information deletion process according to a fifth embodiment in the present invention.
Figure 14:
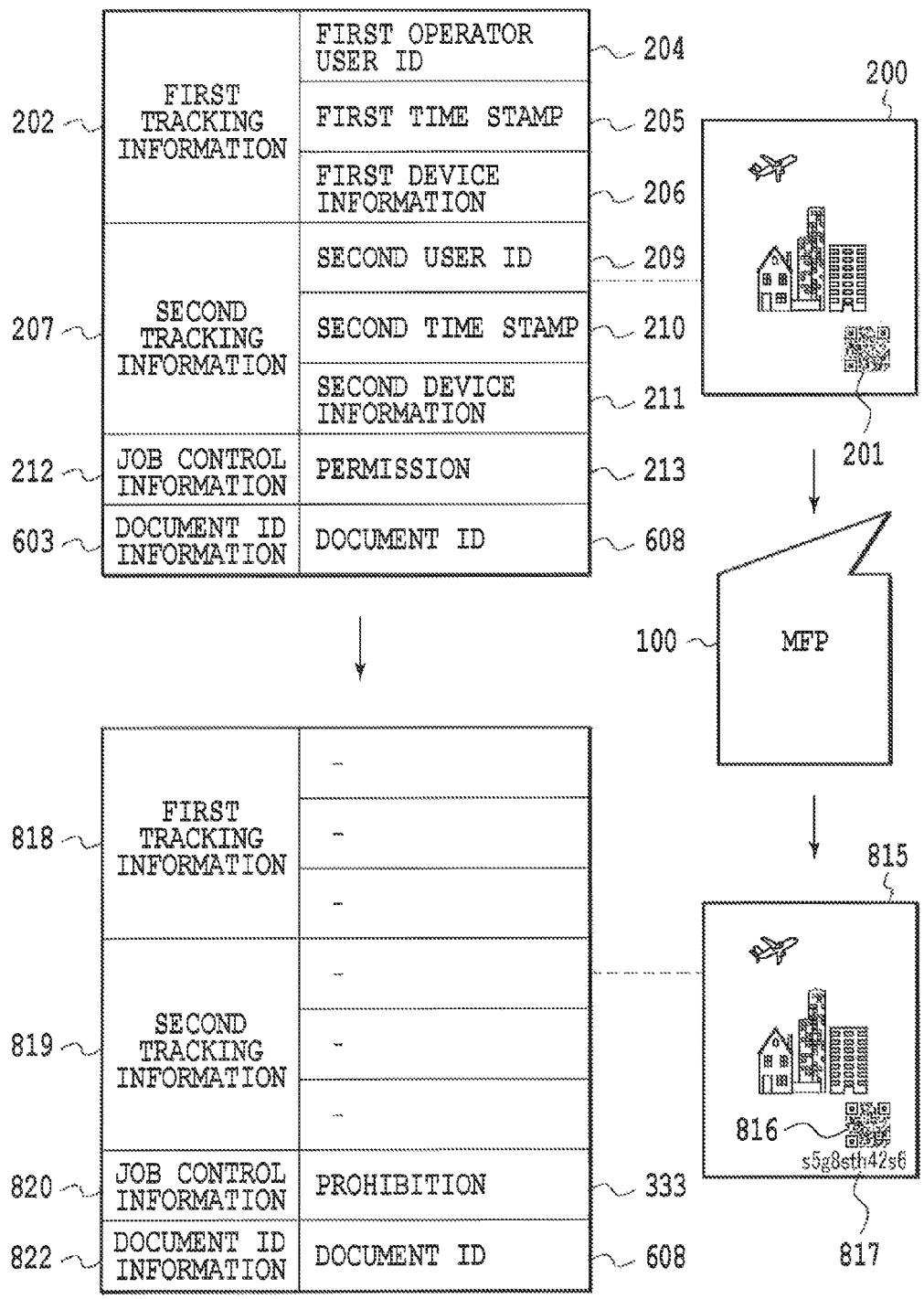
FIG. 14 is a diagram showing an updated situation of information included in a two-dimensional code according to the fifth embodiment in the present invention.

FIGS. 13A and B are flow charts showing a process flow according to the fifth embodiment in the present invention. FIG. 14 is an example of a document and document output in regard to the fifth embodiment. In the present embodiment, as shown in FIG. 14 specific document ID information 603 which can specify a document is designed to be included in the two-dimensional code. Step S10 to step S27 show the processes identical to those in FIG. 5. That is, in step S10 to step S17 the processes similar to those in FIG. 5 are executed, but when the control unit 101 determines at step S17 that there is no two-dimensional code, the process goes to step S53. At step S53, the control unit generates the additional information as described above, but on this occasion, in the present embodiment, the document ID information 603 is designed to be included in the additional information. When the process goes to step S18, in step S18 and step S19 the processes similar to those in FIG. 5 are executed.

In the present embodiment, in a case where it is determined at step S19 that the control unit 101 determines the tracking information deletion flag as "1", the process goes to step S50. In a case where it is determined at step S19 that the tracking information deletion flag is determined as "0", the process goes to step S26, but in a case where it is determined at step S17 that there is no two-dimensional code and generation of additional information is newly made at step S53, the update of the two-dimensional code at step S26 is not necessary.

At step S50, the control unit 101 extracts the document ID information 603 from the additional information. Image data, in which the document ID 608 included in the extracted document ID information 603 is set to characters by the control unit 101, is generated (step S51). When the image data is generated, the tracking information is deleted by the control unit 101 (step S20). On this occasion, when the document ID information 603 is included in the tracking information, only the tracking information other than the document ID information 603 may be deleted (step S40). After the process at step S20 or step S40, the process goes to step S21, but the processes similar to those in FIG. 5 are executed until step S23.

In the present embodiment, at step S52 the control unit 101 combines the character image of the document ID 608 generated at step S51 with the document to which the two-dimensional code is added at step S23. The document generated at step S52 is outputted from the output unit 108 (step S24). As a result of the above processes, as shown in FIG. 14. upon copying the document 200 or the like, when the tracking information deletion is selected, the output such as a document 815 is obtained. The two-dimensional code 816 in which the tracking information is deleted is added to the outputted document 815.

First tracking information 818, second tracking information 819, and job control information 820 as shown in FIG. 14 are included in the two-dimensional code 816 added to the document 815, but the content of each tracking information is deleted. The two-dimensional code 816 and a character image 817 in which the document ID 608 is set to characters are added to the document 815. It should be noted that in the aforementioned fourth embodiment, the document ID information 603 is included in the second tracking information, but in the present embodiment, is retained outside of the tracking information. In this manner, the document ID information 603 can be retained in any format.

As described above, in the present embodiment, in a case of changing the additional information to the prohibition of the job setting, the document ID for specifying the document is set to characters, and the document to which the document ID is added in such a manner as to be visible for a user is outputted, which enables the retrieval of the tracking information from the output document. Therefore, the personal information can be deleted without degrading the security level to prevent leakage of the personal information.

[Sixth Embodiment]

A difference of the sixth embodiment in the present invention from the first embodiment will be explained. In the first embodiment, the multi function peripheral reads the document, the tracking information within the additional information is deleted, and the job control information is changed to the prohibition of the job, which will be outputted. At the sixth embodiment, not all kinds of jobs are prohibited in a case of deleting the tracking information, but a part of the jobs is prohibited, and jobs are permitted in such a manner that the other jobs can be executed. Hereinafter, mainly the difference from the first embodiment, will be explained.

Figure 15B:
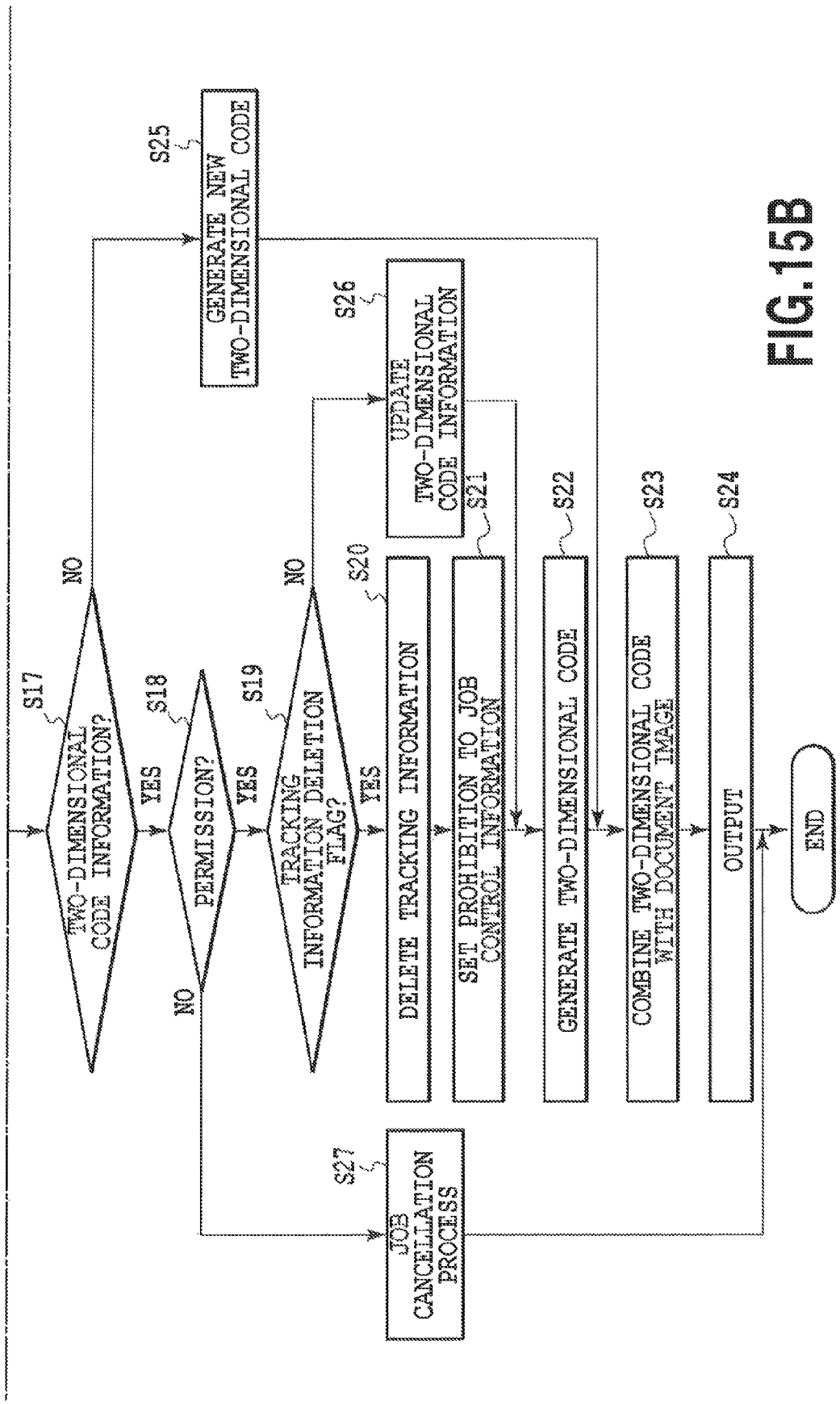
FIG. 15B is a flow chart showing a tracking information deletion process according to a sixth embodiment in the present invention.

FIGS. 15A and B are flow charts showing a process flow according to the present embodiment. Step S10 to step S27 show the processes identical to those in FIG. 5. Step S10 surd step S11 execute the processes similar to those in FIG. 5. When an instruction of a job selection is received from the operating unit 105 at step S11, it is determined at step S60 whether or not the job having received the instruction is fax. When it is not the fax, the process goes to step S61, wherein it is determined whether or not the job is electronic data transmission. Accordingly, when the job is the fax or the electronic data transmission, the process goes to step S12, and if the job is not either the fax or the electronic data transmission, the process goes to step S14. Therefore, deletion of the tracking information is not performed. Here, in the present embodiment, it is assumed that step S60 and step S61 perform the output via an external IF unit (telephone line I/F unit 112, LAN I/F unit 111 or the like), but is not limited thereto.

Figure 16A:
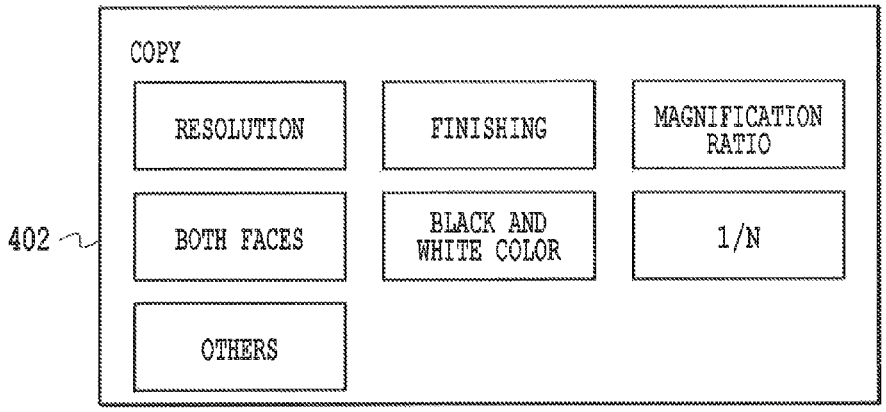
FIG. 16A is a diagram showing an example of an operating unit display according to the sixth embodiment in the present invention.
Figure 16B:
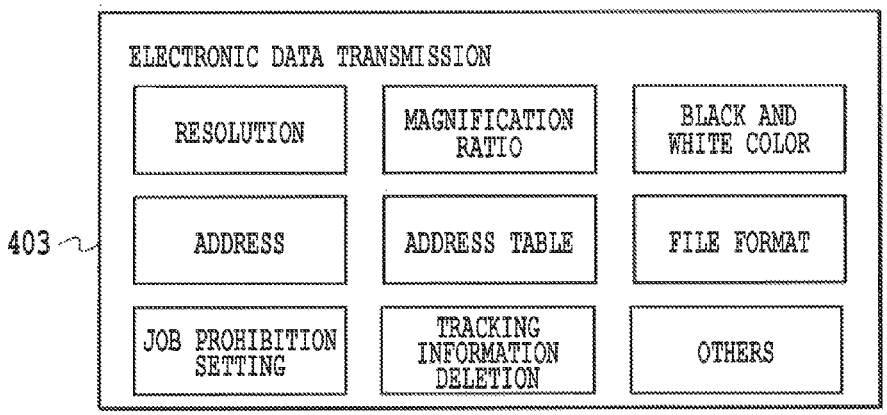
FIG. 16B is a diagram showing an example of an operating unit display according to the sixth embodiment in the present invention.
Figure 16C:
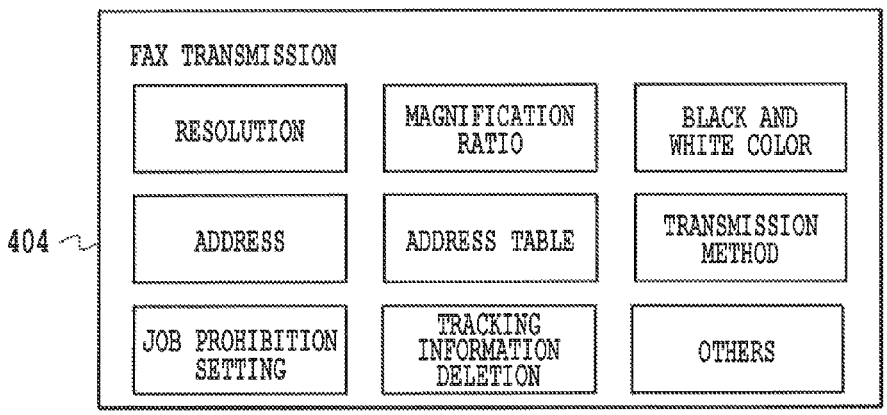
FIG. 16C is a diagram showing an example of an operating unit display according to the sixth embodiment in the present invention.

The processes other than the processes at step S60 and are step A61 are identical to those in the first embodiment, but in a case where the job is not the fax or the electronic data transmission as described above, since the processes of step S12 and step S13 are not executed, for example, in a case where the received job is a copy, the deletion of the tracking information can not be resultantly performed. Specially in a case where a user instructs a copy as shown in FIGS. 16A, B and C, a selection screen as shown in FIG. 16A is displayed, the selection of deleting the tracking information can not be performed at copying. On the other hand, by referring to FIGS. 16 A, B and C, a selection of the tracking information deletion is displayed as shown in each of FIG. 16B and FIG. 16C, and the tracking information deletion can be selected.

As described above, in the present embodiment, in a case where the additional information is changed to the prohibition of the job setting, not all the kinds of jobs are prohibited in a case of deleting the tracking information, but a part of the jobs are prohibited and the job is permitted in such a manner that the other jobs can be executed. Thereby the personal information can be deleted without degrading the security level only at the time of sending the document to an outside by means of the fax, the electronic data transmission or the like to prevent the leakage of the personal information. As a result, in a case of, for example, document copying or the like within a company, the tracking information is designed to remain as much as possible, and the tracking information can be deleted only at the time of the outputting to an outside of a company, thus enabling a flexible operation adapted to this system of the company.

Other Embodiments

Aspects of the present invention can also be realized by a computer of a system or apparatus (or devices such as a CPU or MPU) that reads and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-044056, filed Mar. 1, 2011, which is hereby incorporated by reference herein in its entirety.

What is claimed is:

1. An apparatus comprising:
   a reading unit configured to read a document including a two-dimensional code including tracking information and output permission information;
   an extracting unit configured to extract the tracking information and output permission information from the two-dimensional code including the tracking information and output permission information in a document image obtained by the reading unit; and
   an outputting unit configured to output a document image, wherein the document image includes a two-dimensional code including not the extracted tracking information but output prohibit information and does not include the two-dimensional code including the tracking information and output permission information.

2. The apparatus according to claim 1, wherein the tracking information includes information of a user who has instructed outputting of the document.

3. The apparatus according to claim 1, wherein the tracking information includes information of the date and time in which outputting of the document has been performed.

4. The apparatus according to claim 1, further comprising:
   a generating unit configured to delete the extracted tracking information out of information being included in the two-dimensional code including the tracking information and output permission information, change the extracted output permission information into the output prohibit information, and generate the two-dimensional code including not the extracted tracking information but the output prohibit information from information obtained by the deleting and the changing; and
   an adding unit configured to add the two-dimensional code generated with the generating unit to the document image,
   wherein the outputting unit outputs a document image to which the two-dimensional code generated with the adding unit has been added.

5. A method comprising:
   reading a document including a two-dimensional code including tracking information and output permission information;
   extracting the tracking information and output permission information from the two-dimensional code including the tracking information and output permission information in a document image obtained by the reading; and
   outputting a document image, wherein the document image includes a two-dimensional code including not the extracted tracking information but output prohibit information, and does not include the two-dimensional code including the tracking information and output permission information.

6. The method according to claim 5, wherein the tracking information includes information of a user who has instructed outputting of the document.

7. The method according to claim 5, wherein the tracking information includes information of the date and time in which outputting of the document has been performed.

8. The method according to claim 5, further comprising:

deleting the extracted tracking information out of information being included in the two-dimensional code including the tracking information and output permission information;

changing the extracted output permission information into the output prohibit information;

generating the two-dimensional code including not the extracted tracking information but the output prohibit information from information obtained by the deleting and the changing; and adding the generated two-dimensional code to the document image, wherein outputting the document image includes outputting the document image to which the generated two-dimensional code has been added.

9. A non-transitory computer-readable medium storing a program for causing a computer to function as an apparatus, the apparatus comprising:

a reading unit configured to read a document including a two-dimensional code including tracking information and output permission information;

an extracting unit configured to extract the tracking information and output permission information from the two-dimensional code including the tracking information and output permission information in a document image obtained by the reading unit; and an outputting unit configured to output a document image, wherein the document image includes a two-dimensional code including not the extracted tracking information but output prohibit information, and does not include the two-dimensional code including the tracking information and output permission information.

* * * * *